(12) United States Patent
Morise (10) Patent No.: US 11,486,493 B2
(45) Date of Patent: Nov. 1, 2022

(54) VEHICULAR PARKING LOCK MECHANISM

(71) Applicant: TOYOTA JIDOSHA KABUSHIKI KAISHA, Toyota (JP)

(72) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/645,731

(22) Filed: Dec. 22, 2021

(65) Prior Publication Data

US 2022/0205534 A1 Jun. 30, 2022

(30) Foreign Application Priority Data

Dec. 24, 2020 (JP) .............................. JP2020-215823

(51) Int. Cl.
*F16H 63/34* (2006.01)

(52) U.S. Cl.
CPC ..... *F16H 63/3425* (2013.01); *F16H 63/3466* (2013.01); *F16H 63/3491* (2013.01)

(58) Field of Classification Search
CPC .. F16H 63/34; F16H 63/3425; F16H 63/3466; F16H 63/3491
See application file for complete search history.

(56) References Cited

U.S. PATENT DOCUMENTS

| | | | |
|---|---|---|---|
| 9,777,836 B1 * | 10/2017 | Lee | ........................... F16H 3/66 |
| 2008/0173121 A1 | 7/2008 | Kimura et al. | |
| 2012/0325615 A1 * | 12/2012 | Keating | .............. F16H 63/3425 |
| | | | 192/220.2 |
| 2015/0219208 A1 * | 8/2015 | Albertson | ............... F16H 59/10 |
| | | | 74/473.23 |
| 2020/0248806 A1 * | 8/2020 | Klein | .................. F16H 63/3433 |

FOREIGN PATENT DOCUMENTS

| | | |
|---|---|---|
| DE | 102018130666 A1 * | 6/2020 |
| JP | H05-288266 A | 11/1993 |
| JP | 2008-180250 A | 8/2008 |
| JP | 2013095251 A * | 5/2013 |

* cited by examiner

*Primary Examiner* — David R Morris
*Assistant Examiner* — Lori Wu
(74) *Attorney, Agent, or Firm* — Hunton Andrews Kurth LLP (57) ABSTRACT

A vehicular parking lock mechanism includes a parking gear, a parking pole, a lock member, and a lock releasing member. The parking pole includes a first parking pole member having a meshing tooth, and a second parking pole member having a cam protrusion. When the lock releasing member is pulled in one direction, and the second parking pole member is moved to a manually released position, the cam protrusion is disengaged from a second roller of the lock member, and the meshing tooth of the first parking pole member comes out of the parking gear, so that the parking lock mechanism is released from the parking locked state.

6 Claims, 5 Drawing Sheets

RELEASING POSITION

MANUALLY RELEASED POSITION

FIG. 10

VEHICULAR PARKING LOCK MECHANISM

CROSS-REFERENCE TO RELATED APPLICATION

This application claims priority to Japanese Patent Application No. 2020-215823 filed on Dec. 24, 2020, incorporated herein by reference in its entirety.

BACKGROUND

1. Technical Field

The present disclosure relates to a vehicular parking lock mechanism, and in particular to a vehicular parking lock mechanism that can be manually released from a parking locked state in which a parking pole is engaged with a parking gear.

2. Description of Related Art

A vehicular parking lock mechanism is known which has (a) a parking gear, (b) a parking pole having a meshing portion that meshes with the parking gear, the parking pole being able to move closer to and away from the parking gear, to inhibit rotation of the parking gear when the meshing portion is engaged with the parking gear, and (c) a lock member that can reciprocate between a locking position and a releasing position, the lock member being configured to move the parking pole closer to the parking gear and inhibit rotation of the parking gear, via a cam mechanism, when the lock member is moved to the locking position. In a device described in Japanese Unexamined Patent Application Publication No. 2008-180250 (JP 2008-180250 A), which is one example of the parking lock mechanism, the lock member (rod 615) is reciprocated via a detent plate, etc., by an electrically operated actuator (actuator 32), so that the device can be switched between a parking locked state (P range) in which the meshing portion (stop 614) of the parking pole meshes with the parking gear (611), and a released state (a range other than the P range) in which the meshing portion comes out of the parking gear. In the device of JP 2008-180250A, a lock releasing member (P range releasing portion 50) is provided in the electrically controlled actuator, and the parking locked state is manually released by manually operating the lock releasing member.

SUMMARY

In JP 2008-180250 A, the lock releasing member is provided in the electrically controlled actuator, which is effective against an abnormality, such as disconnection, in the electrically controlled actuator, but the parking locked state may not be released by the lock releasing member when there is an abnormality in a transmission path from the electrically controlled actuator to the lock member. In a vehicular parking lock mechanism of a manual operation type in which the lock member is mechanically reciprocated by a shift lever, via a detent plate, etc., too, the parking locked state may not be released by the shift lever, when there is an abnormality in a transmission path from the shift lever to the lock member.

The present disclosure provides a vehicular parking lock mechanism that can be manually released from the parking locked state with reliability, by use of a lock releasing member.

A vehicular parking lock mechanism according to one aspect of the present disclosure has (a) a parking gear, (b) a parking pole having a meshing portion configured to mesh with the parking gear, the parking pole being movable closer to and away from the parking gear, and configured to inhibit rotation of the parking gear when the meshing portion is engaged with the parking gear, (c) a lock member that is reciprocable between a locking position and a releasing position, the lock member being configured to move the parking pole closer to the parking gear and inhibit rotation of the parking gear, via a cam mechanism, when the lock member is moved to the locking position, and (d) a lock releasing member. In the vehicular parking lock mechanism, the cam mechanism includes a cam protrusion provided on the parking pole, and a cam engaging portion provided on the lock member, and the cam engaging portion is configured to be engaged with the cam protrusion, to move the parking pole closer to the parking gear, and engage the meshing portion with the parking gear, when the lock member is moved from the releasing position to the locking position. The parking pole includes a first parking pole member having the meshing portion, and a second parking pole member having the cam protrusion, and the second parking pole member is movable between a normal position and a manually released position, relative to the first parking pole member. The second parking pole member placed in the normal position is operable to engage the meshing portion with the parking gear through engagement of the cam protrusion with the cam engaging portion, and the second parking pole member placed in the manually released position is operable to disengage the cam protrusion from the cam engaging portion, and cause the meshing portion to come out of the parking gear, in a condition where the lock member is placed in the locking position. The lock releasing member is connected to the second parking pole member, and is operable to move the second parking pole member from the normal position to the manually released position.

The vehicular parking lock mechanism according to the above aspect may further include an electrically controlled actuator configured to reciprocate the lock member between the locking position and the releasing position.

In the vehicular parking lock mechanism as described above, the first parking pole member may have an elongate shape, and may be pivotable about an axis of a pole shaft that is located in one end portion of the first parking pole member, the axis of the pole shaft being parallel to a centerline of the parking gear, and the meshing portion may be provided on one side of the first parking pole member that is opposed to the parking gear. The second parking pole member may be placed on one face of the first parking pole member opposite to the parking gear, such that the second parking pole member is movable relative to the first parking pole member in a longitudinal direction of the elongate shape, and the cam protrusion protrudes in a direction opposite to the parking gear. The normal position and the manually released position may be set to be spaced from each other in the longitudinal direction.

In the vehicular parking lock mechanism, the lock releasing member may include an operation portion provided outside a case in which the parking gear, the parking pole, and the lock member are housed, and an engaging portion that is engaged with the second parking pole member in the case. The operation portion may be adapted to be operated to move the second parking pole member from the normal position to the manually released position.

In the vehicular parking lock mechanism as described above, the lock releasing member may include the operation portion and the engaging portion as integral parts, and the operation portion may be operably and movably mounted to the case in a condition where the operation portion protrudes to an outside from the case. The second parking pole member may be configured to be reciprocated between the normal position and the manually released position when the operation portion is reciprocated.

The vehicular parking lock mechanism as described above may further include a guide member that is placed on one side of the lock member opposite to the parking pole, and the guide member may be configured to guide the lock member when moving between the locking position and the releasing position, while restricting displacement of the lock member to the one side opposite to the parking pole. The lock member may include a pair of a first roller and a second roller that are rotatable about axes perpendicular to a direction of movement of the lock member and parallel to each other, and have outer circumferential surfaces that are in rolling contact with each other. The first roller may be engaged with the guide member to restrict displacement of the lock member to one side opposite to the parking pole, and the second roller may be operable as the cam engaging portion that is engaged with the cam protrusion, to move the parking pole closer to and away from the parking gear.

In the vehicular parking lock mechanism according to the above aspect of the present disclosure, the parking pole includes the first parking pole member having the meshing portion, and the second parking pole member having the cam protrusion. When the second parking pole member is moved from the normal position to the manually released position by the lock releasing member, the cam protrusion and the cam engaging portion are disengaged from each other even in a condition where the lock member is placed in the locking position, and the meshing portion of the first parking pole member comes out of the parking gear, so that the parking locked state is released. Namely, since the cam protrusion and the cam engaging portion are disengaged from each other so that the meshing portion is pulled out of the parking gear, the parking locked state can be manually released with reliability by means of the lock releasing member, in the case where there is an abnormality in the electrically controlled actuator that moves the lock member, or in the case where there is an abnormality in a transmission path from the electrically controlled actuator or shift lever to the lock member.

In the case where the vehicular parking lock mechanism includes the electrically controlled actuator that reciprocates the lock member between the locking position and the releasing position, the parking locked state can be manually released with reliability by means of the lock releasing member, even when there is an abnormality in the transmission path from the electrically controlled actuator to the lock member, as compared with the case where the lock releasing member is provided in the electrically controlled actuator as in JP 2008-180250 A. If the lock releasing member is provided in the electrically controlled actuator, the size of the electrically controlled actuator may be increased, and the ease and efficiency with which the actuator is installed on the vehicle may deteriorate. According to the present disclosure, the parking pole is merely divided into the first parking pole member and the second parking pole member, and the second parking pole member is merely moved by the lock releasing member. Thus, the number of components can be small, and the size can be compact, thus making it possible to easily provide the arrangement for manually releasing the parking locked state, without reducing the ease and efficiency with which it is installed on the vehicle.

In the vehicular parking lock mechanism as described above, the first parking pole member has an elongate shape, and is placed pivotably about the axis of the pole shaft parallel to the centerline of the parking gear. Also, the second parking pole member is placed movably in the longitudinal direction of the elongate first parking pole member, and the normal position and the manually released position are set to be spaced apart from each other in the longitudinal direction. Thus, the second parking pole member is merely linearly moved from the normal position to the manually released position, and the parking locked state can be easily released by use of the lock releasing member.

In the vehicular parking lock mechanism as described above, the lock releasing member includes the operation portion provided outside the case, and the engaging portion engaged with the second parking pole member within the case. When the operation portion is operated, to move the second parking pole member from the normal position to the manually released position, the vehicle parking lock mechanism located in the case can be easily released from the parking locked state through operation of the operation portion.

In the vehicular parking lock mechanism as described above, the lock releasing member includes the operation portion and the engaging portion as integral parts, and the operation portion is operably and movably mounted to the case such that it protrudes from the case to the outside. When the operation portion is reciprocated, the second parking pole member is reciprocated between the normal position and the manually released position, so that the parking lock mechanism can be not only released from the parking locked state, but can also return to the parking locked state as needed, thus assuring improved convenience.

In the vehicular parking lock mechanism as described above, the lock member has the first roller and the second roller. The first roller is engaged with the guide member, so that the lock member is moved between the locking position and the releasing position, while the guide member restricts displacement of the lock member to the side opposite to the parking pole. On the other hand, the second roller as the cam engaging portion is engaged with the cam protrusion. With this arrangement, the parking pole is smoothly moved closer to and away from the parking gear as the lock member moves, and the vehicle parking lock mechanism is smoothly switched between the parking locked state and the released state. Also, the outer circumferential surfaces of the first roller and second roller are in contact with each other, and a load is transmitted from the parking pole to the guide member via the first roller and second roller. Thus, the lock member can be simply and inexpensively constructed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The present disclosure is applied to a vehicular parking lock mechanism of a shift-by-wire (SBW) type in which a shift range selected by a shift range selector, such as a shift lever, is electrically established by an electrically controlled actuator, such as an electric actuator or a hydraulic actuator. However, the present disclosure may also be applied to a parking lock mechanism of a manual operation type in which the shift range is mechanically changed with a shift lever, via an interlocking device, such as a link or a cable. The shift ranges include at least a P (parking) range for parking in which power transmission is cut off, and rotation of the output shaft is mechanically inhibited. When the P range is selected, the parking lock mechanism is placed in the parking locked state. In addition to the P range, the shift ranges may also include a D (drive) range that permits forward traveling, and a R (reverse) range that permits backward traveling. The vehicle may be selected from various types of vehicles, such as an engine-driven vehicle that generates power through combustion of fuel, electric vehicle that is driven by an electric motor, and a hybrid vehicle including two or more power sources.

A parking gear is provided on a rotary shaft (such as an output shaft) that is mechanically rotated in accordance with rotation of the vehicle wheels. When a parking pole is engaged with the parking gear, rotation of the rotary shaft, and rotation of the wheels, are mechanically inhibited. The parking pole has an elongate shape, for example, and is placed pivotably about the axis of a pole shaft that is located in one end portion of the first parking pole member. The axis of the pole shaft is parallel to the centerline (center of rotation) of the parking gear and. However, the parking pole may be arranged to linearly reciprocate so as to move closer to and away from the parking gear. Thus, the parking pole may take various forms. A lock member is provided in a distal end portion of a parking rod, for example, and is reciprocated between the locking position and the releasing position, along with the parking rod.

A cam mechanism has a cam protrusion provided on the parking pole, and a cam engaging portion provided on the lock member. With the cam protrusion and the cam engaging portion engaged with each other, the parking pole is moved closer to the parking gear, and the meshing portion is brought into meshing engagement with the parking gear. For example, at least one of the cam protrusion and the cam engaging portion is provided with an inclined face, and the parking pole is moved closer to and away from the parking gear based on the inclined face. While the cam engaging portion and the cam protrusion may only be in sliding contact with each other, an inclined face may be provided on one of the cam protrusion and the cam engaging portion, and a roller that is engaged with the inclined face to be rolled or rotated may be provided on the other. Namely, the roller may be provided as the cam protrusion. The inclined face may be a conical face.

A first parking pole member has an elongate shape, for example, and is placed pivotably about the axis of a pole shaft parallel to the centerline of the parking gear and located in one end portion of the first parking pole member. On the other hand, a second parking pole member is placed movably relative to the first parking pole member in the longitudinal direction of the elongate shape, and is movable between the normal position and the manually released position that are set to be spaced from each other in the longitudinal direction. However, the second parking pole member may be placed movably in a direction perpendicular to the longitudinal direction of the first parking pole member. The manner of movement (connection) of the second parking pole member relative to the first parking pole member is determined as appropriate, according to the manner of movement of the parking pole by the cam mechanism, for example.

A lock releasing member is configured to move the second parking pole member from the normal position to the manually released position, through manual operation for linear movement or rotational movement, for example. However, the manner of operation is determined as appropriate, according to the manner of movement of the second parking pole member, for example. The lock releasing member has an engaging portion engaged with the second parking pole member, and an operation portion, for example. While the engaging portion and the operation portion may be formed as an integral body, an interlocking device, such as a link or a cable, may be provided between the engaging portion and the operation portion. Namely, the operation portion may be provided in a case, such as a transmission case, or may be provided in the vicinity of the driver's seat in the vehicle cabin, for example. The lock releasing member may be constructed such that the operation portion is removable or detachable, for example, and the operation portion may be coupled to the engaging portion as needed, so that the second parking pole member can be moved to the manually released position.

The lock member is provided with a pair of first roller and second roller, such that their outer circumferential surfaces are in rolling contact with each other, for example. The first roller is arranged to be engaged with a guide member, while the second roller as the cam engaging portion is arranged to be engaged with the cam protrusion. In this case, the first roller and second roller are attached to the lock member via mounting pins, or the like, such that the rollers cannot be displaced. However, at least one of the first and second rollers may be arranged to be displaced in a direction perpendicular to the direction of movement of the lock member, namely, in a direction in which the lock member moves closer to or away from the parking pole or guide member, so that the outer circumferential surfaces of these rollers can be surely brought into rolling contact with each other. The first roller and the second roller may be placed in the lock member such that they can rotate independently of each other in a non-contact state, or one or both of the first roller and the second roller may be omitted. When one of the cam engaging portion and the cam protrusion is a roller that is in rolling contact with the other, and the second parking pole member is moved linearly between the normal position and the manually released position, the direction of the movement is desirably in parallel with the direction of movement of the lock member when it is moved between the locking position and the releasing position. When the cam engaging portion and the cam protrusion are in sliding contact with each other, the direction of movement of the second parking pole member is not necessarily in parallel with the direction of movement of the lock member.

One embodiment of the present disclosure will be described in detail with reference to the drawings. In the following embodiment, components or parts depicted in the drawings are simplified or deformed as needed for the sake of description, and the ratios of dimensions, shapes, angles, etc. of the respective components or parts are not necessarily accurate.

Figure 1:
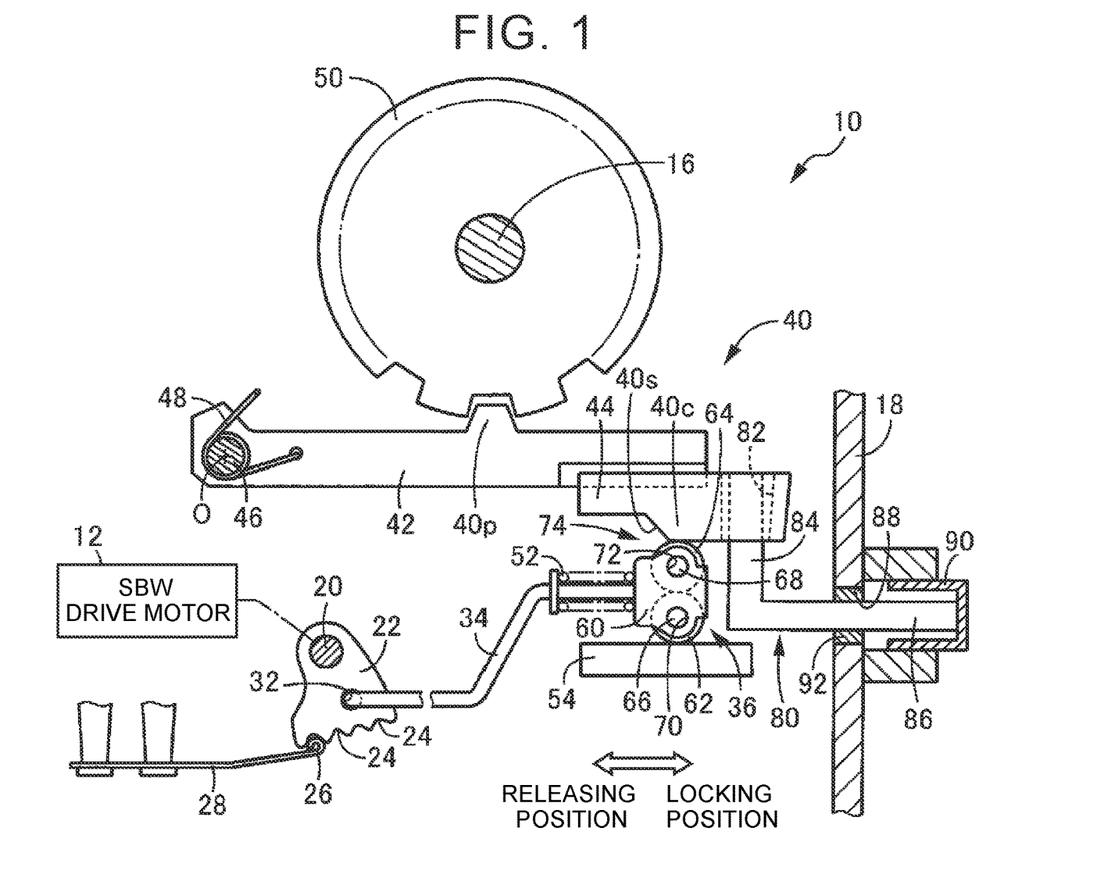
FIG. 1 is a view schematically showing the configuration of a vehicular parking lock mechanism as one embodiment of the present disclosure, which is in a parking locked state.

FIG. 1 schematically shows the configuration of a vehicular parking lock mechanism 10 as one embodiment of the present disclosure. The vehicular parking lock mechanism 10 is a shift-by-wire (SBW) type parking lock mechanism that electrically establishes a shift range selected with a shift range selector, such as a shift lever, by means of an electrically controlled SBW drive motor 12, or the like. The SBW drive motor 12 corresponds to an electrically controlled actuator. The shift range indicates a power transmission state of an automatic transmission, and is selected from, for example, a P range for parking, R range for reverse or backward traveling, N range in which power transmission is cut off, and D range for forward traveling. For example, when the shift lever is operated to a P selection position, the P range is established in which power transmission is cut off, and rotation of an output shaft 16 of the automatic transmission is mechanically inhibited. When the shift lever is operated to an R selection position, the automatic transmission is placed in the R range in which the vehicle can travel backward. When the shift lever is operated to an N selection position, the automatic transmission is placed in the N range. When the shift lever is operated to a D selection position, the automatic transmission is placed in the D range in which the vehicle can travel forward.

The SBW drive motor 12 is provided inside or outside a transmission case 18, such that it can rotate a range changeover shaft 20 placed inside the transmission case 18. The transmission case 18 houses the automatic transmission, and corresponds to a case in which a principal portion of the vehicular parking lock mechanism 10 of this embodiment is housed. The range changeover shaft 20 is pivoted about its axis by the SBW drive motor 12, according to the shift range selected. A detent plate 22 is fixed to the range changeover shaft 20, and the detent plate 22 is pivoted about the axis of the range changeover shaft 20, according to the shift range, and is positioned at a selected one of four positions, i.e., a P position corresponding to the P range, R position corresponding to the R range, N position corresponding to the N range, and D position corresponding to the D range. A distal end portion of the detent plate 22 is provided with protrusions and recesses including four positioning recesses 24, and an engaging portion 26 is adapted to be engaged with one of the positioning recesses 24. The engaging portion 26 is formed by rounding a distal end portion of a spring plate 28, and is displaced following the shape of the protrusions and recesses, due to elastic deformation of the spring plate 28, while providing the detent plate 22 with a certain degree of restraint (positioning force) at each of the above positions P, R, N, D. The spring plate 28 is directly or indirectly attached to the transmission case 18. FIG. 1 shows a condition where the P range is selected, and the detent plate 22 is positioned at the P position, after being pivoted counterclockwise about the range changeover shaft 20.

The detent plate 22 has a connecting hole 32, and a parking rod 34 is relatively pivotably connected to the connecting hole 32. As the detent plate 22 pivots, the parking rod 34 is reciprocated generally linearly in the longitudinal direction, i.e., the lateral direction in FIG. 1. A lock member 36 is mounted at a distal end portion of the parking rod 34, and the lock member 36 is moved between a locking position in the right direction of FIG. 1, and a releasing position in the left direction, as the parking rod 34 moves. The locking position is established when the detent plate 22 is pivoted counterclockwise about the range changeover shaft 20, to the P position, as shown in FIG. 1. The releasing position is established when the detent plate 22 is pivoted clockwise about the range changeover shaft 20, to a non-P position, such as the R position. In this embodiment, a play mechanism is provided between the detent plate 22 and the parking rod 34, or in a middle portion of the parking rod 34, so that at least the distal end portion of the parking rod 34 at which the lock member 36 is provided is held at the specific releasing position, when the detent plate 22 is in a non-P position as one of the R position to the D position.

The lock member 36 provided at the distal end portion of the parking rod 34 is arranged to be able to engage with a parking pole 40. In the course of movement of the lock member 36 from the releasing position to the locking position, the parking pole 40 is pivoted upward in FIG. 1, so that a meshing tooth 40$p$ is brought into meshing engagement with a parking gear 50. The parking gear 50 is mounted on the output shaft 16 of the automatic transmission such that it cannot rotate relative to the output shaft 16. When the meshing tooth 40$p$ meshes with the parking gear 50, a parking locked state is established in which rotation of the parking gear 50, and further, rotation of the output shaft 16 and vehicle wheels, are mechanically inhibited. The parking pole 40 has an elongate shape, and is placed in the transmission case 18, such that the parking pole 40 can pivot about the axis O of a pole shaft 46 parallel to the output shaft 16 and located in its one end portion of the parking pole 40. The parking pole 40 is biased in a mesh releasing direction (clockwise direction in FIG. 1) by a return spring 48 as a biasing device, and the lock member 36 pivots the parking pole 40 in the meshing direction (counterclockwise direction in FIG. 1), against the bias force of the return spring 48.

In the parking pole 40, the meshing tooth 40$p$ as an engaging portion is provided on one side facing the parking gear 50, namely, on the upper face as viewed in FIG. 1, such that the meshing tooth 40$p$ protrudes toward the parking gear 50, while a cam protrusion 40$c$ is provided on the opposite face, such that it protrudes downward in FIG. 1 away from the parking gear 50. When the lock member 36 is engaged with the cam protrusion 40$c$, the parking pole 40 is pivoted counterclockwise, and the meshing tooth 40$p$ is brought into meshing engagement with the parking gear 50. A side face of the cam protrusion 40$c$ on the releasing position side provides an inclined face 40$s$, and the parking pole 40 is pivoted about the axis O of the pole shaft 46 by the action of the inclined face 40$s$. Namely, the parking pole 40 is placed such that it can move closer to and away from the parking gear 50. When the parking pole 40 is pivoted by the lock member 36 in the meshing direction, or upward in FIG. 1, the meshing tooth 40$p$ moves closer to and meshes with the parking gear 50, and the parking locked state is established in which rotation of the parking gear 50 is inhibited. FIG. 1 shows the parking locked state. The detent plate 22, parking rod 34, lock member 36, parking pole 40, parking gear 50, etc. as constituent elements of the vehicular parking lock mechanism 10 are placed in the transmission case 18, along with the automatic transmission (not shown).

The lock member 36 is biased toward the distal end of the parking rod 34 by a spring member (a compression coil spring in this embodiment) 52 as a biasing device, to be held at a distal end position on the locking position side, so that the parking pole 40 pivots in the meshing direction. However, when the meshing tooth 40p of the parking pole 40 interferes with the parking gear 50, the lock member 36 is allowed to be retracted in the direction toward the releasing position, relative to the parking rod 34, against the bias force of the spring member 52. A guide member 54, which is placed on one side of the lock member 36 opposite to the parking pole 40, guides the lock member 36 so that the lock member 36 moves between the locking position and the releasing position, while the guide member 54 restricts displacement of the lock member 36 to one side opposite to the parking pole 40. Thus, the lock member 36 is reciprocated linearly between the locking position and the releasing position, in a condition where it is supported by the guide member 54. Also, the range changeover shaft 20, which extends in parallel with the output shaft 16, is placed on the same side of the output shaft 16 as the pole shaft 46, and the lock member 36 is reciprocated linearly in the direction (the lateral direction in FIG. 1) generally parallel to the longitudinal direction of the parking pole 40. The guide member 54 is placed in the transmission case 18, and is fixed to the transmission case 18.

The lock member 36 includes a connecting head 60 connected to the parking rod 34, and a pair of a first roller 62 and a second roller 64 placed in the connecting head 60. The connecting head 60 is formed in a generally U-shape or fork-like shape, and the first roller 62 and second roller 64 are mounted between a pair of side walls of the forked connecting head 60. The first roller 62 and the second roller 64 are rotatable about respective axes parallel to each other and perpendicular to the direction of movement of the lock member 36, more specifically, are rotatable about the axes parallel to the output shaft 16. The first roller 62 and the second roller 64 are mounted to the connecting head 60 via mounting pins 66, 68, respectively, such that their outer circumferential surfaces are in rolling contact with each other. The first roller 62 and second roller 64 are arranged vertically, between the parking pole 40 and the guide member 54 that are disposed on the opposite sides of the lock member 36 in the vertical direction. The first roller 62 is in rolling contact with the guide member 54, to be rotated against the guide member 54, and the second roller 64 is in rolling contact with the parking pole 40, to be rotated against the parking pole 40. Also, the first roller 62 and second roller 64 are rotatably supported, with some play relative to the mounting pins 66, 68, respectively, and are displaceable by given amounts in the vertical direction relative to the connecting head 60, such that their outer circumferential surfaces are surely in rolling contact with each other. In this connection, the mounting pins 66, 68 may be integrally fixed to the first roller 62 and second roller 64, and mounting holes 70, 72 may be formed in an oval shape that is elongate in the vertical direction, such that the first roller 62 and second roller 64 can be displaced vertically relative to the connecting head 60. Also, the first roller 62 and second roller 64 may be mounted to the connecting head 60 such that at least one of the rollers 62, 64 can be displaced vertically relative to the connecting head 60. In this case, the outer circumferential surfaces of the rollers 62, 64 can be surely brought into rolling contact with each other, even if the other roller cannot be displaced vertically. Also, the mounting pins 66, 68 may be omitted, and the first roller 62 and second roller 64 may be directly mounted to the connecting head 60.

In the vehicular parking lock mechanism 10 as described above, when the P range is selected, and the detent plate 22 is pivoted from a non-P position to the P position by the SBW drive motor 12, the lock member 36 is moved, via the parking rod 34, from the releasing position to the locking position. At this time, the first roller 62 that is in contact with the guide member 54 is rolled or rotated, so that the lock member 36 is prevented from being displaced to the side opposite to the parking pole 40, while the second roller 64 that is in contact with the parking pole 40 is rolled or rotated, and engaged with the cam protrusion 40c, so that the parking pole 40 is smoothly moved closer to the parking gear 50 to mesh with the same, and the parking lock mechanism 10 is thus placed in the parking lock state as shown in FIG. 1. Namely, when the lock member 36 is moved from the releasing position to the locking position, the first roller 62 and second roller 64 are sandwiched under pressure between the parking pole 40 and the guide member 54, and are rotated relative to each other in a condition where their outer circumferential surfaces are in contact with each other. As a result, while displacement of the lock member 36 to the side opposite to the parking pole 40 is restricted, the parking pole 40 is pivoted in the meshing direction, to mesh with the parking gear 50, through engagement of the second roller 64 with the cam protrusion 40c. Then, in the parking locked state in which the lock member 36 has been moved to the locking position, the second roller 64 climbs up on the distal end face of the cam protrusion 40c that is formed to be in parallel with the direction of movement of the lock member 36, so that the parking locked state is stably maintained, with the aid of the rolling resistance of the first roller 62 and the second roller 64. In this embodiment, the second roller 64 and the cam protrusion 40c constitute a cam mechanism 74 that causes the parking pole 40 to get close to and mesh with the parking gear 50. The second roller 64 corresponds to the cam engaging portion provided in the lock member 36.

Figure 4:
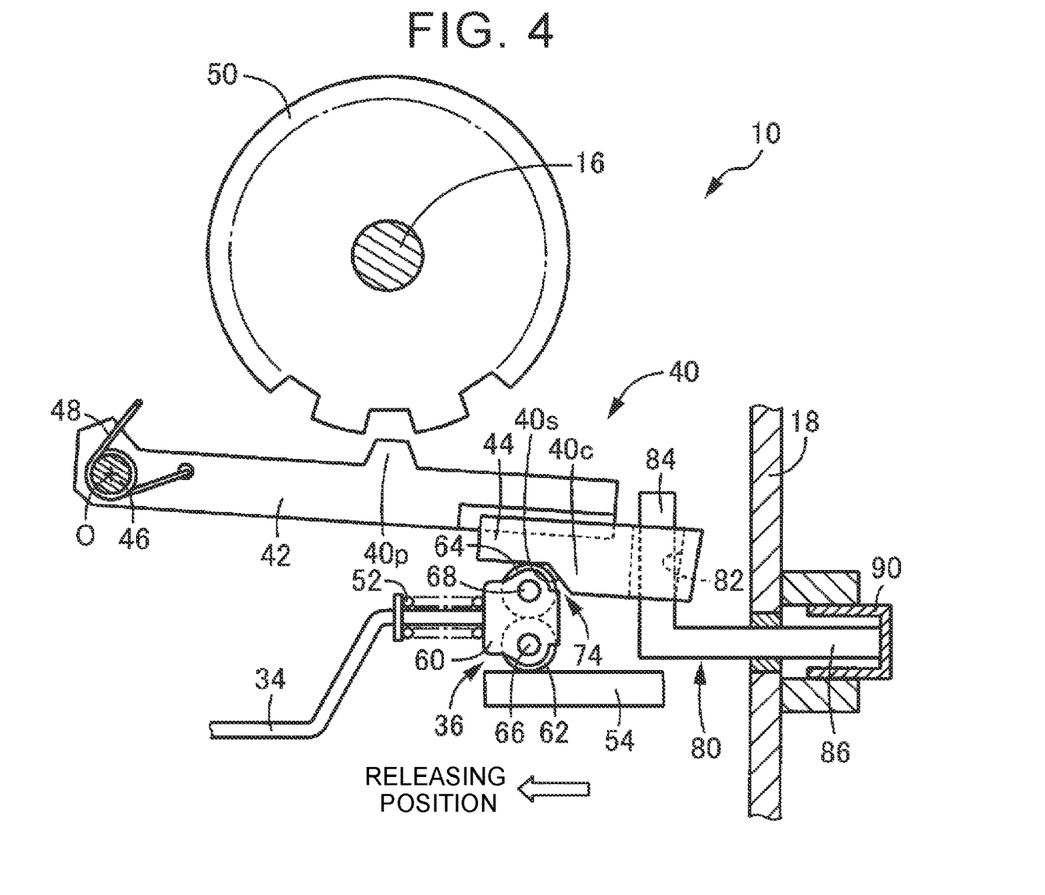
FIG. 4 is a view showing the vehicular parking lock mechanism of FIG. 1 when it is in a released state in which a lock member is placed in a releasing position.

When a range, such as the R range, other than the P range is selected, in the parking locked state shown in FIG. 1, and the detent plate 22 is rotated by the SBW drive motor 12 from the P position to a non-P position, such as the R position, the lock member 36 is moved from the locking position to the releasing position, via the parking rod 34, as shown in FIG. 4. As a result, the second roller 64 and the cam protrusion 40c are disengaged from each other, and the parking pole 40 is pivoted clockwise about the pole shaft 46 under the bias force of the return spring 48, so that the meshing tooth 40p comes out of the parking gear 50, and the parking gear 50 is brought into the released state in which it can rotate. FIG. 4 shows the released state in which the parking pole 40 and the parking gear 50 are disengaged from each other.

Figure 2:
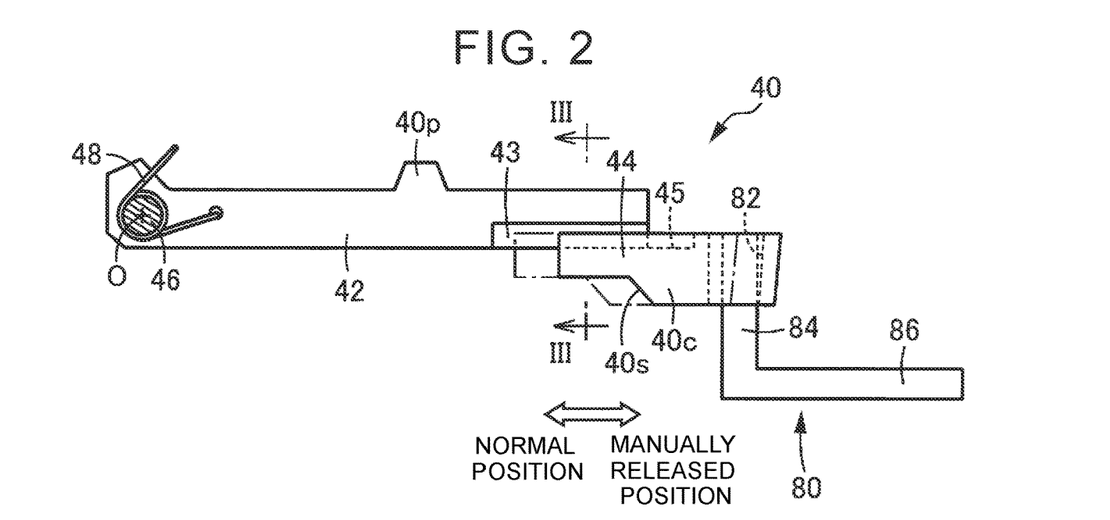
FIG. 2 is a front view of a parking pole of the vehicular parking lock mechanism of FIG. 1, showing a state in which a second parking pole member is placed in a manually released position, as compared with a normal position.
Figure 3:
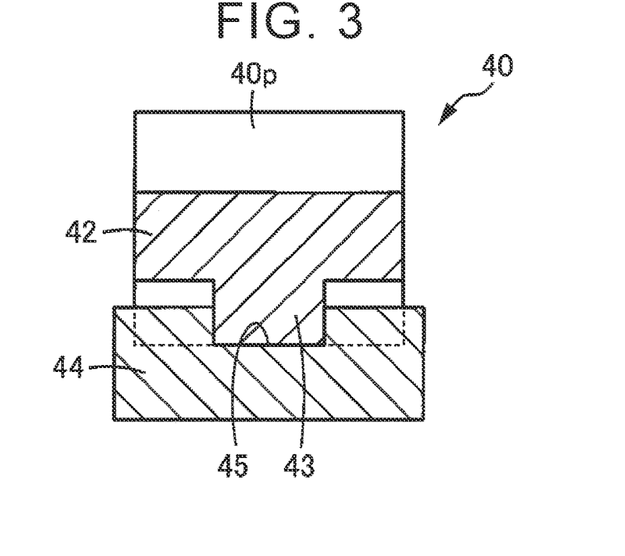
FIG. 3 is an enlarged cross-sectional view of a portion as viewed in a direction of arrows III-III in FIG. 2.

When the lock member 36 cannot be moved from the locking position to the releasing position, in a situation where the SBW drive motor 12 is at fault, or there is an abnormality in a transmission path from the detent plate 22 to the lock member 36, the parking locked state shown in FIG. 1 cannot be released, which makes it impossible to rotate the output shaft 16, and cause the vehicle to move by itself. In this embodiment, the parking pole 40 is divided into two members, i.e., a first parking pole member 42 and a second parking pole member 44, as shown in FIG. 2 and FIG. 3, and the second parking pole member 44 is moved by use of a lock releasing member 80, so that the parking locked state can be released through manual operation. FIG. 3 is an enlarged cross-sectional view of a portion of FIG. 2 as viewed in a direction of arrows III-III.

In FIG. 2 and FIG. 3, the first parking pole member 42, which is formed in the shape of an elongate, generally rectangular parallelepiped, is placed in the transmission case 18 such that it can pivot about the axis O of the pole shaft 46 located in one end portion of the first parking pole member 42. The meshing tooth 40p is integrally provided on the upper face of the first parking pole member 42 that is opposed to the parking gear 50. The second parking pole member 44 is placed on the lower surface side of an elongate distal end portion of the first parking pole member 42 opposite to the parking gear 50, such that the second parking pole member 44 can move relative to the first parking pole member 42 in the longitudinal direction of the elongate shape (the lateral direction in FIG. 2, which will be simply referred to as "longitudinal direction"). The cam protrusion 40c is integrally provided on the lower surface side of the second parking pole member 44 such that the cam protrusion 40c protrudes downward. As shown in FIG. 3, a protrusion 43 that extends in the longitudinal direction is provided on the lower surface of the first parking pole member 42, whereas a groove 45 in which the protrusion 43 is slidably fitted is provided in the upper surface of the second parking pole member 44. With the protrusion 43 and the groove 45 engaged with each other, the direction of movement of the second parking pole member 44 is defined. In another embodiment, a protrusion may be provided on the second parking pole member 44, and a groove may be provided in the first parking pole member 42.

The second parking pole member 44 has a connecting hole 82, and the lock releasing member 80 having an engaging portion 84 engaged with the connecting hole 82 is operable to reciprocate the second parking pole member 44 between a normal position and a manually released position that are set to be spaced from each other in the longitudinal direction. In this embodiment, the normal position is located closer to the pole shaft 46, and the manually released position is located remote from the pole shaft 46. The lock releasing member 80 is an L-shaped integral rod-like member, of which one end portion provides an engaging portion 84, while the other end portion provides an operation portion 86. The lock releasing member 80 is mounted to the transmission case 18 such that the operation portion 86 extends out in the longitudinal direction. More specifically, as shown in FIG. 1, the operation portion 86 is held by the transmission case 18, such that it protrudes outward of the transmission case 18, from an insertion hole 88 provided in the transmission case 18, and a plug 90 is detachably attached to the transmission case 18, so that the operation portion 86 cannot be operated to move the lock releasing member 80. An oil seal 92 is attached to the insertion hole 88 of the transmission case 18, so as to oil-tightly seal a clearance between the insertion hole 88 and the lock releasing member 80.

In FIG. 2, the second parking pole member 44 indicated by solid lines is in a state where it is placed in the manually released position, and the second parking pole member 44 indicated by one-dot chain lines is in a state where it is placed in the normal position. FIG. 1 and FIG. 4 show the states where the second parking pole member 44 is placed in the normal position. In a condition where the plug 90 is attached to the transmission case 18, and the lock releasing member 80 cannot be operated, the second parking pole member 44 is held in the normal position. While the second parking pole member 44 is configured to be held in the normal position by friction, for example, a positioning mechanism, such as a spring, may be provided for positioning the second parking pole member 44 in the normal position. In this condition, the second parking pole member 44 is pivoted about the axis O of the pole shaft 46, integrally with the first parking pole member 42. Accordingly, when the lock member 36 is reciprocated between the releasing position and the locking position by means of the SBW drive motor 12, the parking pole 40 is integrally pivoted about the axis O of the pole shaft 46, due to engagement of the inclined face 40s of the cam protrusion 40c with the second roller 64, so that the vehicular parking lock mechanism 10 is switched between the parking locked state shown in FIG. 1, and the released state shown in FIG. 4. Between the connecting hole 82 and the engaging portion 84, some play is provided so that the parking pole 40 can be integrally pivoted about the axis O of the pole shaft 46.

Figure 5:
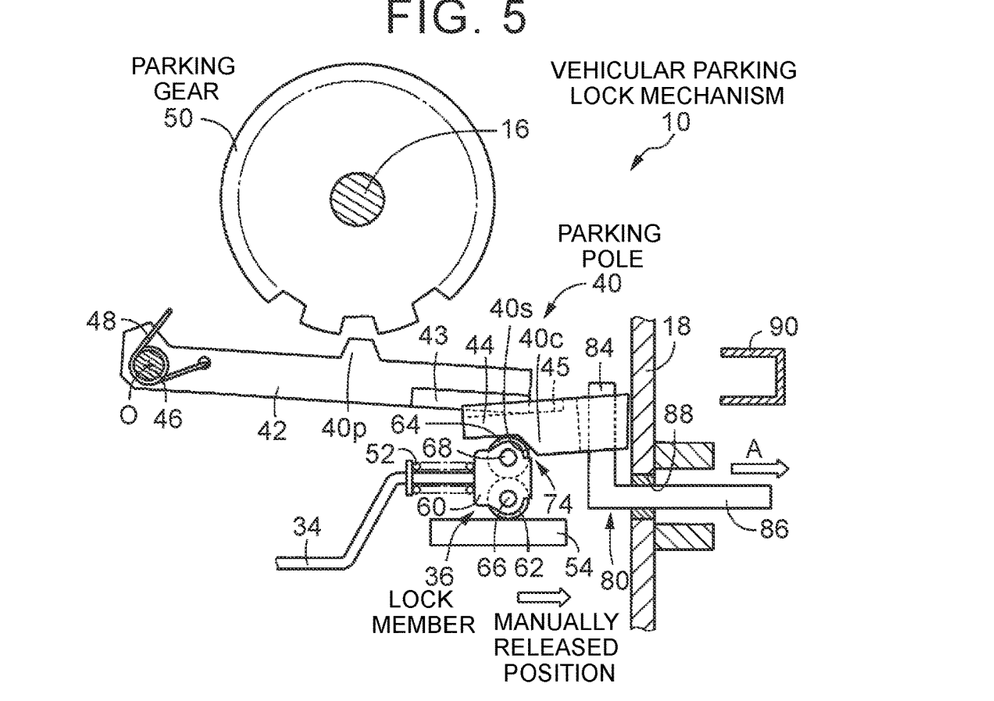
FIG. 5 is a view showing the vehicular parking lock mechanism of FIG. 1 when it is in a released state in which the second parking pole member is placed in the manually released position by means of a lock releasing member.

On the other hand, the second parking pole member 44 is in the manually released position, when engagement of the cam protrusion 40c with the second roller 64 as the cam engaging portion is released, in a condition where the lock member 36 is placed in the locking position as shown in FIG. 1. Accordingly, when the lock member 36 cannot be moved from the locking position to the releasing position, due to a failure of the SBW drive motor 12 or an abnormality in the transmission path from the detent plate 22 to the lock member 36, for example, in the parking locked state shown in FIG. 1, the plug 90 is removed as shown in FIG. 5, and the operation portion 86 of the lock releasing member 80 is pulled in the direction of arrow A, so that the second parking pole member 44 can be moved to the manually released position, and the parking locked state can be released. Namely, when the second parking pole member 44 is moved to the manually released position, and the cam protrusion 40c and the second roller 64 are disengaged from each other, the first parking pole member 42 is pivoted clockwise about the pole shaft 46 under the bias force of the return spring 48, and the meshing tooth 40p comes out of the parking gear 50, to be brought into the released state. As a result, the parking gear 50 is allowed to rotate, and further, the output shaft 16 and the wheels are allowed to rotate, so that the vehicle can move by itself. While the first parking pole member 42 and the second parking pole member 44 form an angle (i.e., the parking pole 40 is bent) in FIG. 5, the second parking pole member 44, which is in the manually released position, may be pivoted about the axis O of the pole shaft 46, integrally with the first parking pole member 42, in a condition where the second parking pole member 44 is placed in the manually released position as indicated by the solid lines in FIG. 2. In this connection, if the operation portion 86 is pushed inward in a direction opposite to that of arrow A, the cam protrusion 40c is caused to climb up onto the second roller 64, through engagement of the inclined face 40s of the cam protrusion 40c with the second roller 64, so that the second parking pole member 44 can be moved to the normal position. Thus, the parking locked state of FIG. 1 can be resumed.

Thus, in the vehicular parking lock mechanism 10 of this embodiment, the parking pole 40 includes the first parking pole member 42 having the meshing tooth 40p, and the second parking pole member 44 having the cam protrusion 40c. When the second parking pole member 44 is moved from the normal position to the manually released position by means of the lock releasing member 80, the cam protrusion 40c and the second roller 64 are disengaged from each other even in a condition where the lock member 36 is placed in the locking position, and the meshing tooth 40p of the first parking pole member 42 comes out of the parking gear 50, resulting in release of the parking locked state. Namely, since the cam protrusion 40c and the second roller 64 are disengaged from each other, and the meshing tooth 40p is pulled away from the parking gear 50, the parking locked state can be manually released with reliability, by means of the lock releasing member 80, when there is an abnormality in the SBW drive motor 12, or there is an abnormality in the transmission path from the SBW drive motor 12 to the lock member 36.

The parking locked state can be manually released with reliability by means of the lock releasing member 80, even when there is an abnormality in the transmission path from the SBW drive motor 12 to the lock member 36, as compared with the case where a lock releasing member is provided in the SBW drive motor 12, as in JP 2008-180250 A. Also, if the lock releasing member is provided in the SBW drive motor 12, the size of the SBW drive motor 12 may become large, and the ease or efficiency with which the SBW drive motor 12 is installed on the vehicle may deteriorate. However, in the above embodiment, it is only required to divide the parking pole 40 into the first parking pole member 42 and the second parking pole member 44, and move the second parking pole member 44 by means of the lock releasing member 80. Thus, the number of components can be small, and the size can be compact, thus making it possible to easily provide the arrangement for manually releasing the parking locked state, without reducing the ease or efficiency with which it is installed on the vehicle.

The first parking pole member 42, which has an elongate shape, is pivotable about the axis O of the pole shaft 46 parallel to the centerline of the parking gear 50, and the second parking pole member 44 is movable relative to the first parking pole member 42 in the longitudinal direction, between the normal position and the manually release position that are spaced in the longitudinal direction. Thus, the second parking pole member 44 is only required to be linearly moved from the normal position to the manually released position, and the parking locked state can be easily released by use of the lock releasing member 80.

The lock releasing member 80 includes the operation portion 86 provided outside the transmission case 18, and the engaging portion 84 that is engaged with the second parking pole member 44 in the transmission case 18. Since the second parking pole member 44 is moved from the normal position to the manually released position when the operation portion 86 is operated to be moved, the vehicular parking lock mechanism 10 in the transmission case 18 can be easily released from the parking locked state, through moving operation of the operation portion 86.

The lock releasing member 80 includes the operation portion 86 and engaging portion 84 as its integral parts, and the operation portion 86 is movably and operably mounted to the transmission case 18, such that it protrudes to the outside from the transmission case 18. Also, the second parking pole member 44 is reciprocated between the normal position and the manually released position when the operation portion 86 is reciprocated. Thus, it is possible to not only release the parking locked state, but also resume the parking locked state as needed, for improvement of the convenience.

The lock member 36 has the first roller 62 and the second roller 64, and the first roller 62 is engaged with the guide member 54, so that the lock member 36 is moved between the locking position and the releasing position while its displacement to the side opposite to the parking pole 40 is restricted. On the other hand, the second roller 64 is engaged with the cam protrusion 40c as the cam engaging portion. Thus, the parking pole 40 is smoothly moved closer to and away from the parking gear 50 as the lock member 36 moves, and the vehicular parking lock mechanism 10 is smoothly switched between the parking locked state and the released state. Also, the outer circumferential surfaces of the first roller 62 and second roller 64 are in contact with each other, and a load is transmitted from the parking pole 40 to the guide member 54, via the first roller 62 and second roller 64. Thus, the lock member 36 can be easily and inexpensively constructed.

Next, other embodiments of the present disclosure will be described. In the following embodiments, the same reference signs are assigned to components or portions that are substantially identical with those of the illustrated embodiment, and these components or portions will not be described in detail.

Figure 6:
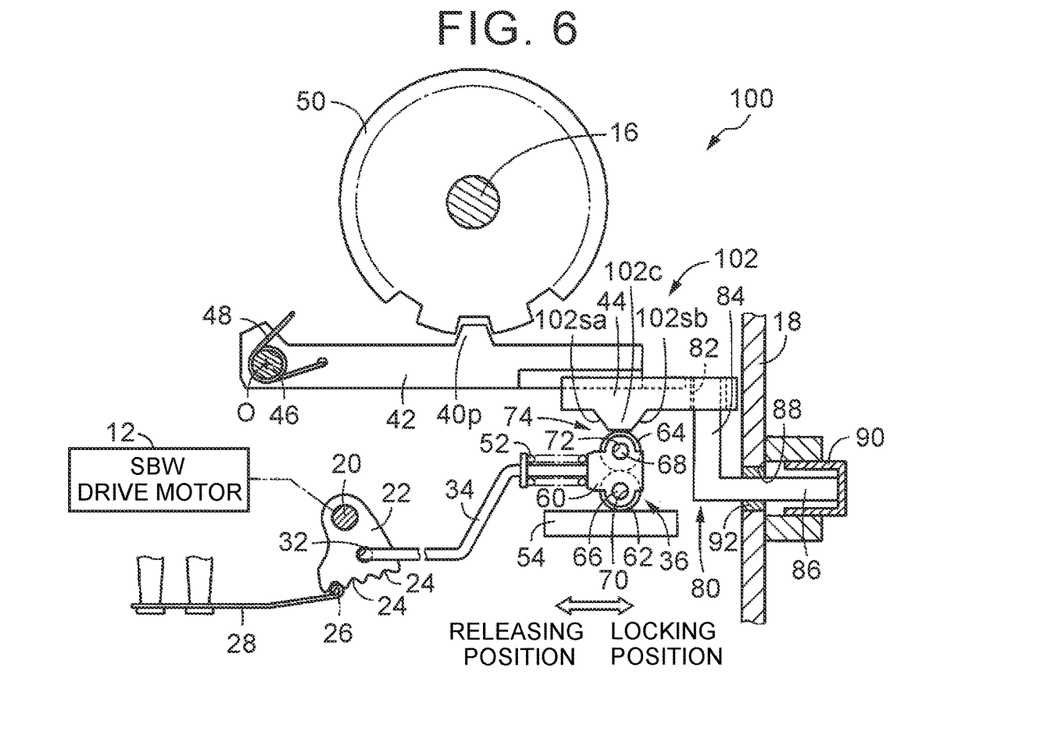
FIG. 6 is a view schematically showing the configuration of a vehicular parking lock mechanism as another embodiment of the present disclosure, which is in a parking locked state corresponding to that of FIG. 1.

FIG. 6 through FIG. 9 illustrate a vehicular parking lock mechanism 100. FIG. 6, which corresponds to FIG. 1, schematically shows the configuration of the vehicular parking lock mechanism 100 in the parking locked state, and FIG. 7, which corresponds to FIG. 2, is a front view of a parking pole 102, while FIG. 8, which corresponds to FIG. 4, shows the vehicular parking lock mechanism 100 in a released state in which the lock member 36 is placed in the releasing position, and FIG. 9, which corresponds to FIG. 5, shows the vehicular parking lock mechanism 100 in the released state in which the second parking pole member 44 has been moved to the manually released position by means of the lock releasing member 80. In the vehicular parking lock mechanism 100, the parking pole 102 is different from the parking pole 40 of the above embodiment. More specifically, a cam protrusion 102c provided on the second parking pole member 44 is formed in a triangular mountain shape that partially protrudes in the direction opposite to the parking gear 50, and inclined faces 102sa, 102sb are provided on the opposite sides of the cam protrusion 102c. In this embodiment, the cam mechanism 74 includes the second roller 64 as the cam engaging portion, and the cam protrusion 102c.

Figure 7:
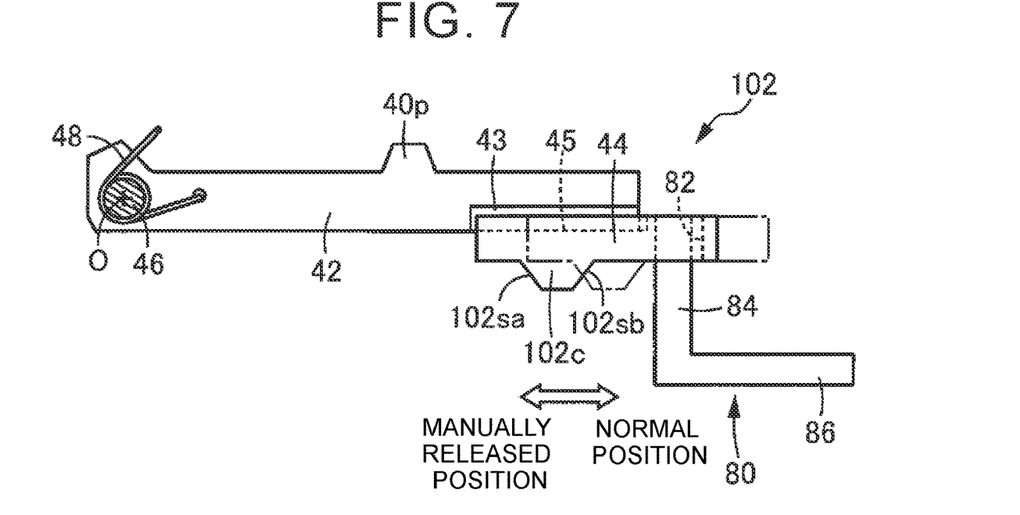
FIG. 7 is a front view of a parking pole of the vehicular parking lock mechanism of FIG. 6.
Figure 8:
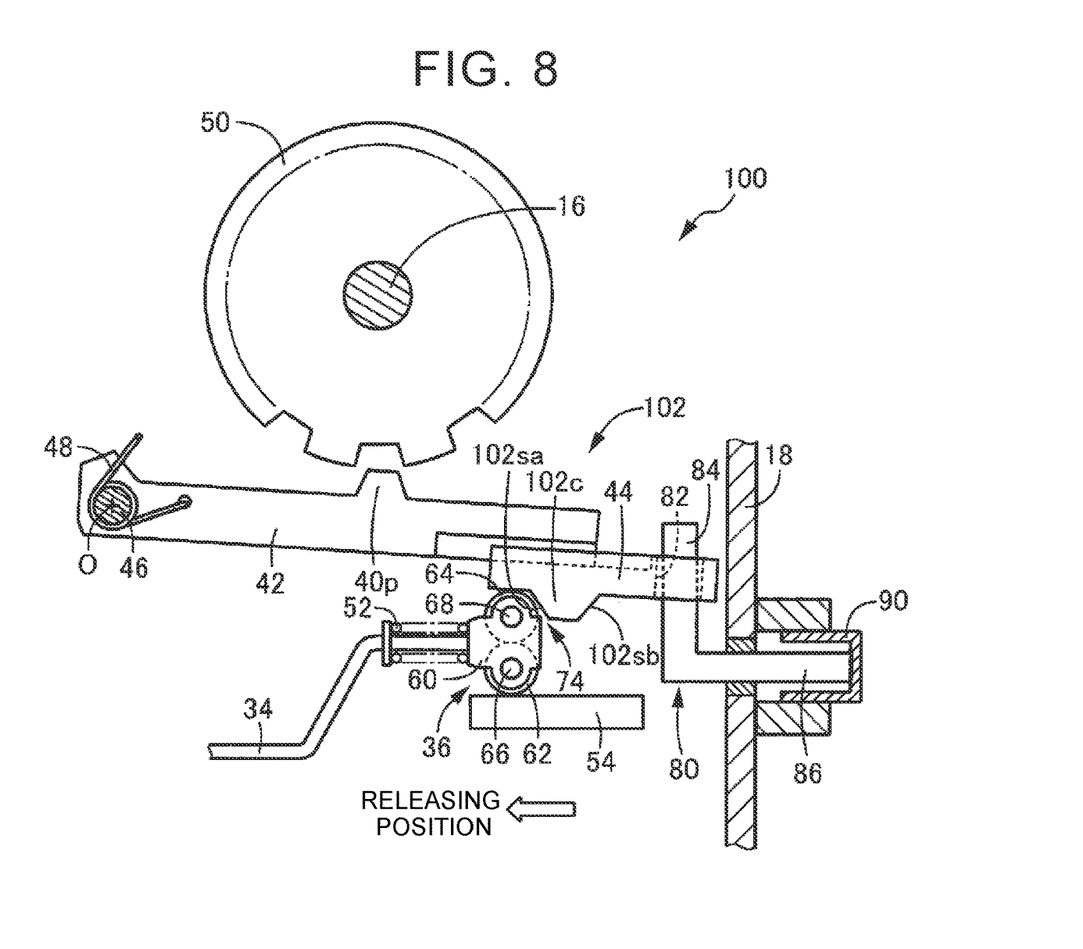
FIG. 8 is a view showing the vehicular parking lock mechanism of FIG. 6 when it is in a released state in which a lock member is placed in a releasing position.

As shown in FIG. 7, the manually released position of the second parking pole member 44 is set on one side closer to the pole shaft 46, and the normal position is set on the other side remote from the pole shaft 46. In FIG. 7, the solid lines indicate a state in which the second parking pole member 44 is placed in the manually released position, and the one-dot chain lines indicate a state in which the second parking pole member 44 is placed in the normal position. FIG. 6 and FIG. 8 show states in which the second parking pole member 44 is held in the normal position. In a condition where the plug 90 is attached to the transmission case 18, and the lock releasing member 80 cannot be operated, the second parking pole member 44 is held in the normal position. In this condition, the second parking pole member 44 is pivoted about the axis O of the pole shaft 46, integrally with the first parking pole member 42. Accordingly, when the lock member 36 is reciprocated between the releasing position and the locking position by means of the SBW drive motor 12, the parking pole 102 is integrally pivoted about the axis O of the pole shaft 46, through engagement of one inclined face 102sa of the cam protrusion 102c with the second roller 64, and the vehicular parking lock mechanism 10 is switched between the parking locked state shown in FIG. 6, and the released state shown in FIG. 8.

Figure 9:
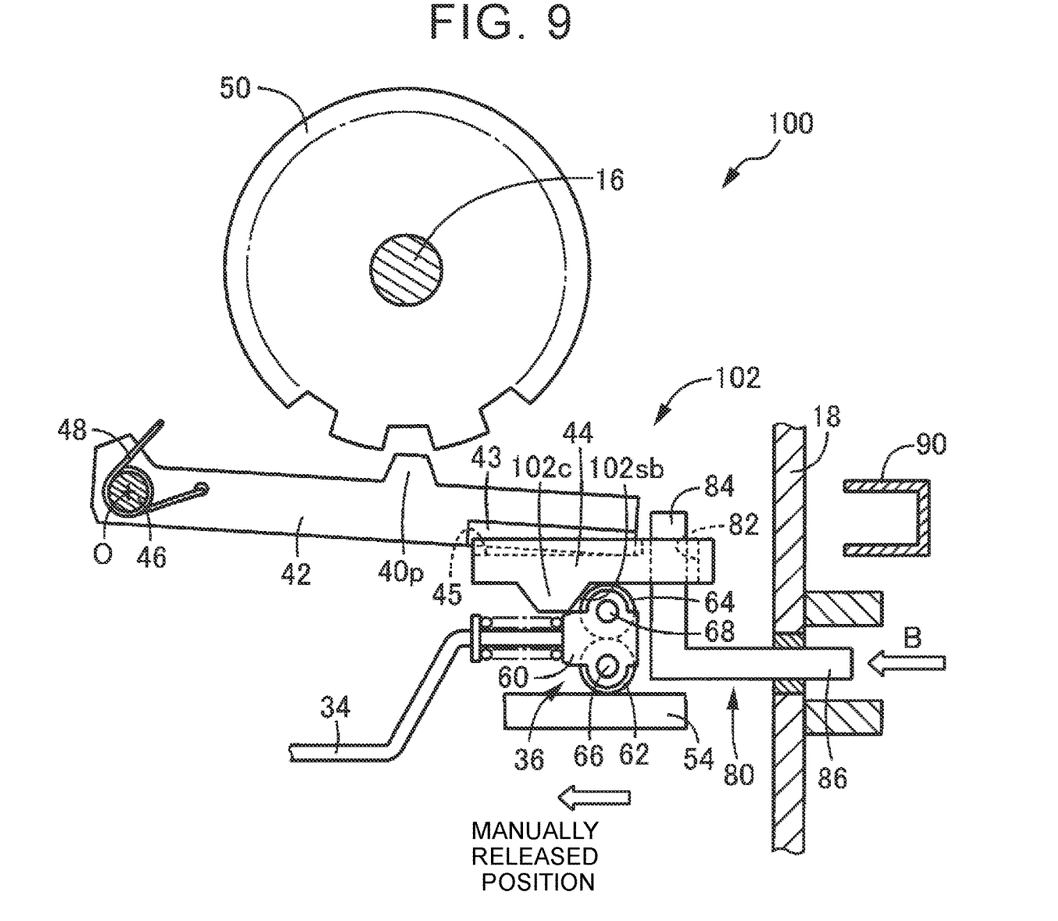
FIG. 9 is a view showing the vehicular parking lock mechanism of FIG. 6 when it is in a released state in which a second parking pole member is placed in a manually released position by means of a lock releasing member.

On the other hand, the second parking pole member 44 is in the manually released position, when the cam protrusion 102*c* is disengaged from the second roller 64 as the cam engaging portion, in a condition where the lock member 36 is placed in the locking position as shown in FIG. 6. When the plug 90 is removed, and the operation portion 86 of the lock releasing member 80 is pushed inward in the direction of arrow B, as shown in FIG. 9, the second parking pole member 44 is moved to the manually released position, and the parking locked state is released. Namely, when the second parking pole member 44 is moved to the manually released position, and the cam protrusion 102*c* and the second roller 64 are disengaged from each other, the first parking pole member 42 is pivoted clockwise about the pole shaft 46, under the bias force of the return spring 48, and the meshing tooth 40*p* comes out of the parking gear 50, to establish the released state. While the first parking pole member 42 and the second parking pole member 44 form an angle therebetween in FIG. 9, the second parking pole member 44 can be pivoted about the axis O of the pole shaft 46, integrally with the first parking pole member 42, in a condition where the second parking pole member 44 is placed in the manually released position as indicated by the solid lines in FIG. 7. If the operation portion 86 is pulled in the direction opposite to the arrow B in the state of FIG. 9, the cam protrusion 102*c* is caused to climb up onto the second roller 64, through engagement of the other inclined face 102*sb* of the cam protrusion 102*c* with the second roller 64, and the second parking pole member 44 can be moved to the normal position. As a result, the parking locked state of FIG. 6 can be resumed.

The vehicular parking lock mechanism 100 as described above can also be released from the parking locked state, when the second parking pole member 44 is moved to the manually released position by the lock releasing member 80 as shown in FIG. 9. Thus, substantially the same effects as those of the above embodiment can be obtained.

Figure 10:
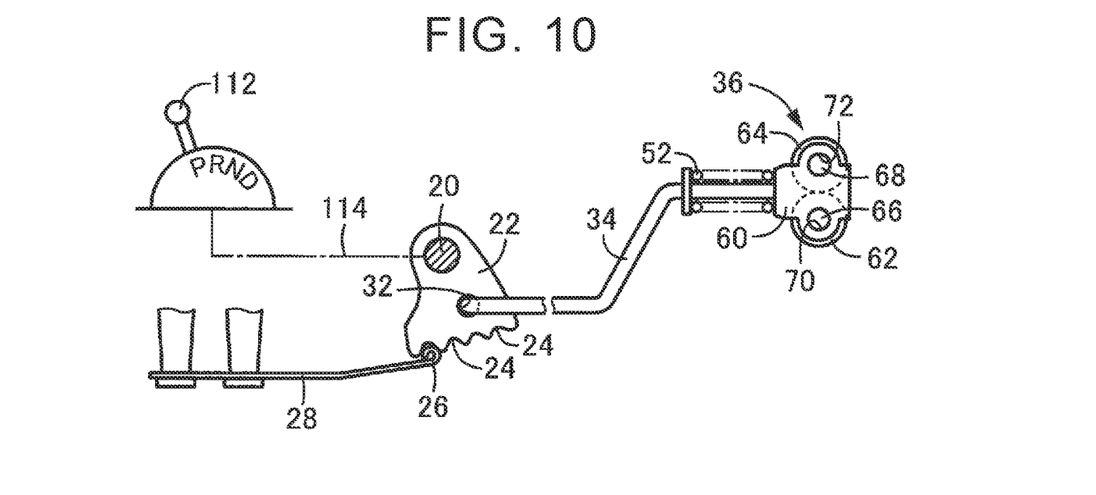
FIG. 10 is a view illustrating a further embodiment of the present disclosure.

In each of the above embodiments, the shift-by-wire type parking lock mechanism is used which is switched between the parking locked state and the released state when the detent plate 22 is pivoted by the SBW drive motor 12. However, a manually operated parking lock mechanism may be used in which the detent plate 22 is mechanically pivoted via an interlocking device 114, such as a link or a cable, according to operation of a shift lever 112 as a shift range selector, as shown in FIG. 10

While the embodiments of the present disclosure have been described in detail, they are merely exemplary ones, and the present disclosure may be embodied with various changes or improvement added to the embodiments, based on the knowledge of those skilled in the art.

What is claimed is:

1. A vehicular parking lock mechanism comprising:
    a parking gear;
    a parking pole having a meshing portion configured to mesh with the parking gear, the parking pole being movable closer to and away from the parking gear, and configured to inhibit rotation of the parking gear when the meshing portion is engaged with the parking gear;
    a lock member that is reciprocable between a locking position and a releasing position, the lock member being configured to move the parking pole closer to the parking gear and inhibit rotation of the parking gear, via a cam mechanism, when the lock member is moved to the locking position; and
    a lock releasing member,
    wherein the cam mechanism includes a cam protrusion provided on the parking pole, and a cam engaging portion provided on the lock member, the cam engaging portion being configured to be engaged with the cam protrusion, to move the parking pole closer to the parking gear, and engage the meshing portion with the parking gear, when the lock member is moved from the releasing position to the locking position,
    wherein the parking pole includes a first parking pole member having the meshing portion, and a second parking pole member having the cam protrusion, the second parking pole member being movable between a normal position and a manually released position, relative to the first parking pole member, the second parking pole member placed in the normal position being operable to engage the meshing portion with the parking gear through engagement of the cam protrusion with the cam engaging portion, the second parking pole member placed in the manually released position being operable to disengage the cam protrusion from the cam engaging portion, and cause the meshing portion to come out of the parking gear, in a condition where the lock member is placed in the locking position, and
    wherein the lock releasing member is connected to the second parking pole member, and is operable to move the second parking pole member from the normal position to the manually released position.

2. The vehicular parking lock mechanism according to claim 1, further comprising an electrically controlled actuator configured to reciprocate the lock member between the locking position and the releasing position.

3. The vehicular parking lock mechanism according to claim 1, wherein:
    the first parking pole member has an elongate shape, and is pivotable about an axis of a pole shaft that is located in one end portion of the first parking pole member, the axis of the pole shaft being parallel to a centerline of the parking gear, the meshing portion being provided on one side of the first parking pole member that is opposed to the parking gear; and
    the second parking pole member is placed on one face of the first parking pole member opposite to the parking gear, such that the second parking pole member is movable relative to the first parking pole member in a longitudinal direction of the elongate shape, and the cam protrusion protrudes in a direction opposite to the parking gear, the normal position and the manually released position being set to be spaced from each other in the longitudinal direction.

4. The vehicular parking lock mechanism according to claim 1, wherein the lock releasing member includes an operation portion provided outside a case in which the parking gear, the parking pole, and the lock member are housed, and an engaging portion that is engaged with the second parking pole member in the case, the operation portion being adapted to be operated to move the second parking pole member from the normal position to the manually released position.

5. The vehicular parking lock mechanism according to claim 4, wherein the lock releasing member includes the operation portion and the engaging portion as integral parts, and the operation portion is operably and movably mounted to the case in a condition where the operation portion protrudes to an outside from the case, the second parking pole member being configured to be reciprocated between the normal position and the manually released position when the operation portion is reciprocated.

6. The vehicular parking lock mechanism according to claim 1, further comprising a guide member that is placed on one side of the lock member opposite to the parking pole, the guide member being configured to guide the lock member when moving between the locking position and the releasing position, while restricting displacement of the lock member to the one side opposite to the parking pole,     wherein the lock member includes a pair of a first roller and a second roller that are rotatable about axes perpendicular to a direction of movement of the lock member and parallel to each other, and have outer circumferential surfaces that are in rolling contact with each other, the first roller being engaged with the guide member to restrict displacement of the lock member to one side opposite to the parking pole, the second roller being operable as the cam engaging portion that is engaged with the cam protrusion, to move the parking pole closer to and away from the parking gear.

\* \* \* \* \*